United States Patent
Young

Patent Number: 6,128,823
Date of Patent: Oct. 10, 2000

[54] KERNEL BUSTER

[76] Inventor: Margery L. Young, 221 Greening La., Ontario, N.Y. 14519

[21] Appl. No.: 09/357,182

[22] Filed: Jul. 20, 1999

[51] Int. Cl.[7] .................................................. A47J 17/02
[52] U.S. Cl. ............................................... 30/121.5; 294/5
[58] Field of Search ............................... 294/5; 30/121.5, 30/123, 123.5

[56] References Cited

U.S. PATENT DOCUMENTS

| | | | |
|---|---|---|---|
| 63,112 | 3/1867 | Siddle | 30/121.5 |
| 187,363 | 2/1877 | Dixon . | |
| 265,995 | 10/1882 | Towns | 30/121.5 |
| D. 268,723 | 4/1983 | Wolff . | |
| D. 274,207 | 6/1984 | Lenagham . | |
| D. 306,114 | 2/1990 | Moll . | |
| D. 331,525 | 12/1992 | Anderson . | |
| D. 374,593 | 10/1996 | Eggert . | |
| 378,503 | 2/1888 | Godfrey | 294/5 |
| 886,510 | 5/1908 | Huguet . | |
| 2,275,536 | 3/1942 | Maisto . | |
| 3,794,368 | 2/1974 | Majeske . | |
| 4,163,575 | 8/1979 | Reidinger, Jr. et al. . | |
| 5,088,782 | 2/1992 | Scottt . | |

*Primary Examiner*—Douglas D. Watts
*Attorney, Agent, or Firm*—John D. Gugliotta

[57] ABSTRACT

The present invention is a device to hold an ear of corn while either eating the corn or scraping the kernels off the ear. One inserts the ear of corn between the tensioned corn cob holders-which are a pair of plastic cups. Then, one grasps the handle and rolls the corn cob across the points of the piercing element, the corn cob turns easily in the cups.

3 Claims, 4 Drawing Sheets

KERNEL BUSTER

RELATED APPLICATIONS

The present invention was first described in Disclosure Document Number 448148 filed on Dec. 4, 1998. There are no previously filed, nor currently any co-pending applications, anywhere in the world.

BACKGROUND OF THE INVENTION

1. Field of the Invention

The present invention relates generally to food preparation and, more particularly, to a device which pierces the tough husks of the kernels on an ear of corn on the cob before it is eaten.

2. Description of the Related Art

In the related art, there exists many patents for aids in eating corn on the cob, including holders and cornscrews, which are inserted into both ends of the cob to allow one to hold a cob while eating without actually touching the hot and buttery cob. Some of these devices are also adapted to accommodate other vegetables and foods as well. However, the art is devoid of any devices which pierce the tough husks of the kernels on the cob thereby allowing the meat inside the kernel to be eaten.

Every red-blooded American loves corn on the cob. A traditional meal dating back to the Pilgrims, corn on the cob began as an indication of a successful harvest that would suffice throughout winter and has become a symbol of summertime celebration. Gaining its reputation from its fresh-off-the-farm taste, corn on the cob finds its way to America's dinner and picnic tables from mid to late summer, complementing a variety of meals ranging from hot dogs to steak. Unfortunately, however, many people, especially the elderly have difficulty eating corn on the cob as it is often difficult for them to bite into the kernels and remove them from the cob. As these people typically are in a weakened state and require the use of dentures, they have difficulty eating specially prepared foods, let alone corn on the cob. Accordingly, there is a need for a means by which the elderly or those requiring the use of dentures can eat corn on the cob easily and comfortably. The development of the Kernel Buster fulfills this need.

The difficulty that persons of advanced age or requiring the use of dentures experience in eating corn on the cob stems from the fact that corn kernels consist of tough outer shells that house the tasty meat. In eating corn on the cob, one must pierce and break-off the outer shell in order to get at the meat, which requires that a strong biting and pulling force be applied. The Kernel Buster eliminates this need by providing a device that pierces the kernels on a cob, allowing access to the meat simply by applying a light biting force. The device consists of a handled, Y-shaped roller bracket that has a rotatable cob cupr on each end. Inserted within the bracket and secured by the cob cups, the device resembles a paint roller wherein, by holding the handle, the cob can be rolled along a flat surface. The device also includes a flat rolling board that has hundreds of kernel piercing points protruding in an upward direction therefrom. By rolling the corn over the rolling board, the piercing points pierce the kernels, leaving them in a state where they can be eaten with ease and comfort, allowing the user to remove the meat while leaving the kernel shell on the cob. Additionally, the roller can be used to apply butter to the corn without getting one's hands messy. As a result, use of the Kernel Buster allows those with limited biting and chewing ability to take part in one of America's most traditional staple foods.

A search of the prior art did not disclose any patents that read directly on the claims of the instant invention; however, the following references were considered related:

| U.S. Pat. No. | Inventor | Issue Date |
| --- | --- | --- |
| 5,088,782 | Scott | February 18, 1992 |
| 4,163,575 | Reidinger, Jr. et al. | August 7, 1979 |
| 3,794,368 | Majeske | February 26, 1974 |
| 2,275,536 | Maisto | March 10, 1942 |
| 886,510 | Huguet | May 5, 1908 |
| 187,363 | Dixon | February 13, 1877 |
| D 374,593 | Eggert | October 15, 1996 |
| D 331,525 | Anderson | December 8, 1992 |
| D 306,114 | Moll | February 20, 1990 |
| D 274,207 | Lenaghan | June 12, 1984 |
| D 268,723 | Wolff | April 26, 1983 |
| D 113,219 | Cowins | February 7, 1939 |

SUMMARY OF THE INVENTION

It is therefore an object of the present invention to provide a Kernel Buster.

It is a feature of the present invention to pierce the kernels on the corn cob by rolling the cob against the piercing points located on the device.

It is another feature of the present invention to support corn on the cob in a rotatable manner.

It is yet another feature of the present invention to provide a handle to support the cob during rolling.

It is still yet another feature of the present invention to allow the user to apply butter to corn on the cob.

It is yet still another feature of the present invention to provide an easy to use design.

It is a feature of the present invention to allow for removing the meat of the kernel and leave the kernel behind.

It is another feature of the present invention to allow virtually anyone to eat corn on the cob.

Briefly described according to one embodiment of the present invention, a Kernel Buster is provided, comprised of a handled, Y-shaped roller bracket that has a rotatable cob cup on each end. Inserted within the bracket and secured by the cob cups, the device resembles a paint roller wherein, by holding the handle, the cob can be rolled along a flat surface. The device also includes a flat rolling board that has hundreds of kernel piercing points protruding in an upward direction therefrom.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

| | |
|---|---|
| 10 Kernel Buster | 30 Roller Board |
| 20 Roller | 31 Roller Board Handle |
| 21 Y-Frame Handle | 32 Roller Board Base |
| 22 Y-Shaped Handle | 33 Kernel Piercing Teeth |
| 23 Cob Cup | |
| 24 Knob | |

DESCRIPTION OF THE PREFERRED EMBODIMENTS

The best mode for carrying out the invention is presented in terms of its preferred embodiment, herein depicted within the Figures.

Detailed Description of the Figures

Figure 1:
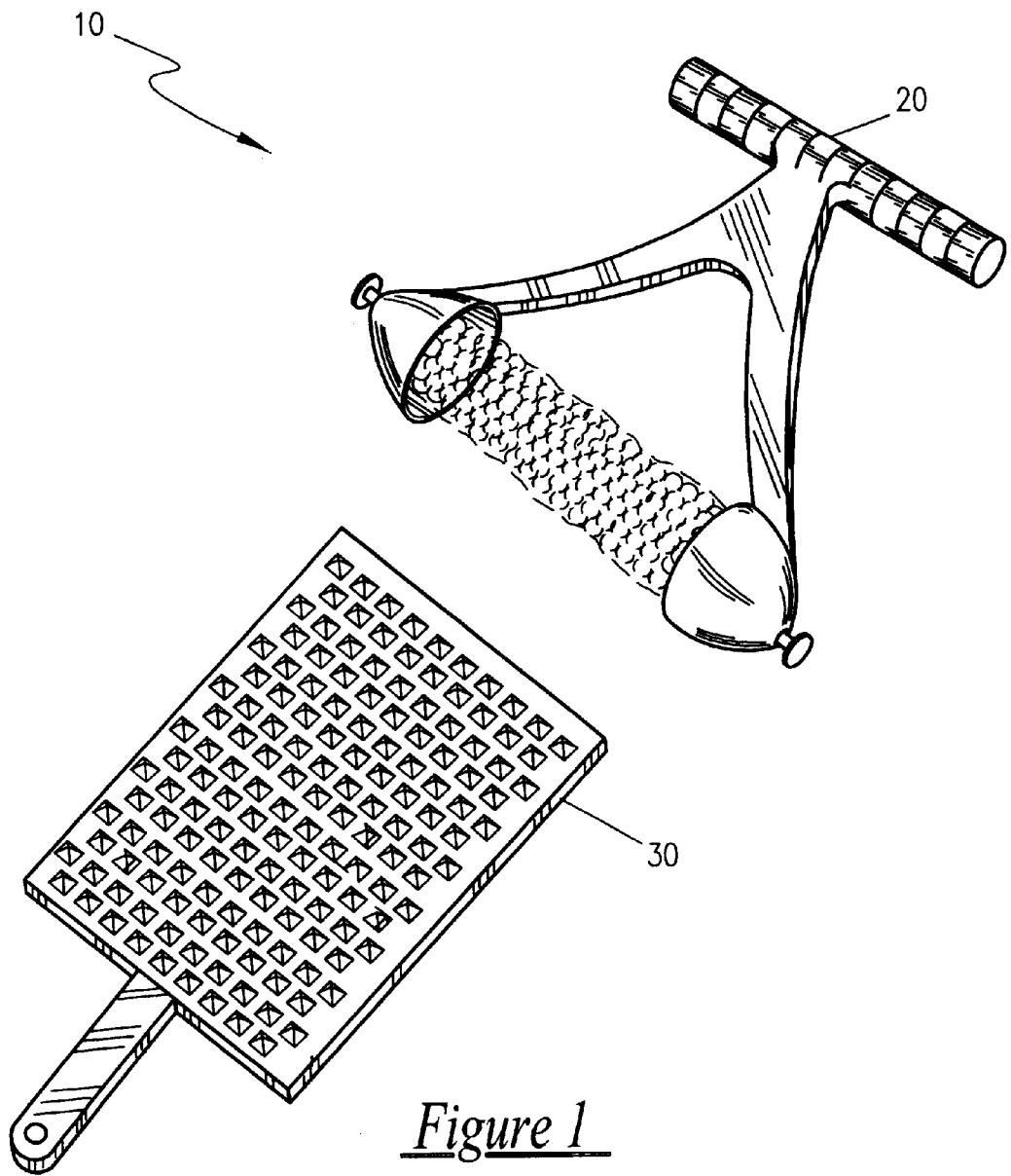
FIG. 1 is an exploded perspective view of a Kernel Buster, according to the preferred embodiment of the present invention.

Referring now to FIG. 1, an exploded perspective view of Kernel Buster 10 is provided comprised of Roller Handle 20 and Rolling Board 30. Roller Handle 20 is of a Y-shaped construction made from a semi-flexible material forming a pair of articulating structural members to allow one to expand the gap between a set of tips of the structural members for inserting therebetween an ear of corn. The distance between the tips of the structural members would be a minimum of six inches, about the size of an average, husked ear of cooked corn. However, this teaching is only given as a suggestion and not meant as a limitation. This size could vary as required up to the maximum length of an ear of corn. Rotatably attached at the ends of the tips of the Y-shaped handle 22 are a pair of cups 23 for securably receiving the ends of the corn cob. The cups 23 are a conical parabolic shape and are attached on the vertex of their outer surface to the tips of the Y-shaped handle 22 thereby aligning the cups 23 such that the concave inner surface of each face each other. The similarly shaped ends of an ear of corn can then be inserted into the cups 23. The ear of corn is thereby free to rotate along the longitudinal axis of the cups 23 defined by a line between the tips of the Y-shaped handle 22. A pair of Knobs 24 provided on tips of the Y-Shaped handle's 22 outer side give one points to grasp when expanding the Y-Shaped handle 22 when inserting an ear of corn.

Figure 2:
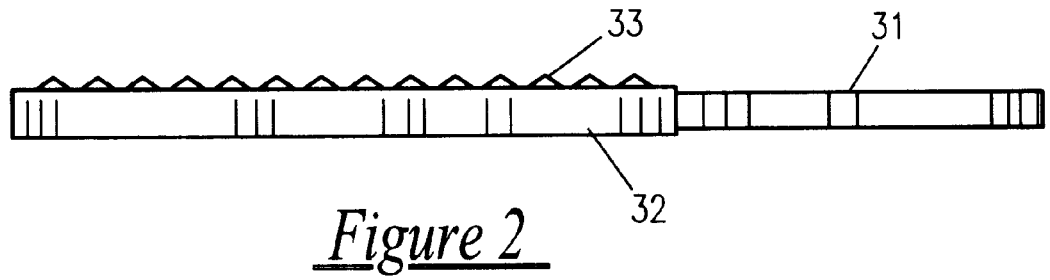
FIG. 2 is a side view of the rolling board of a Kernel Buster, according to the preferred embodiment of the present invention.
Figure 3:
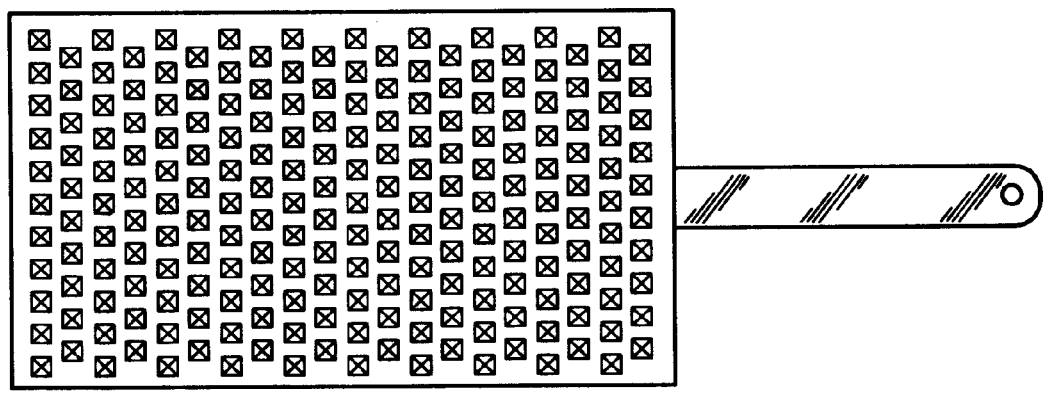
FIG. 3 is a top view of the rolling board of a Kernel Buster, according to the preferred embodiment of the present invention.
Figure 4:
FIG. 4 is a front view of the rolling board of a Kernel Buster, according to the preferred embodiment of the present invention.

Referring now to FIG. 2, 3 and 4, a side, top, and front view of rolling board 30 for a kernel Buster 10 is provided comprised of a handle 31, base 32, and plurality of teeth 33. The base and handle may be made from a variety of materials used in food preparation equipment such as conventional cutting boards and the like. Typically wood or plastic is used but this list is not meant to be exhaustive. The length and width of base 32 may vary as desired with the only requirement being that the width being sufficient to accommodate an ear of corn. The length should be sufficient such that the rolling area provided effectively pierces the husks of the kernels. The handle 31 must be of sufficient length to allow one to get a firm grasp during rolling. As far as the teeth 33 are concerned, they may also be made from a variety of materials with the only requirement being that a sharpened point can be formed. It is envisioned that metals commonly used in manufacturing kitchen utensils would be used, or possibly plastic, but this in no way suggests that other suitable materials could not be employed. The teeth are permanently embedded on one side of base 32 with the pointed side facing outward. The teeth 33 are arranged in rows and columns spaced close enough such that a tooth would be available to pierce every kernel on the ear of corn when rolled against base 32.

Figure 5:
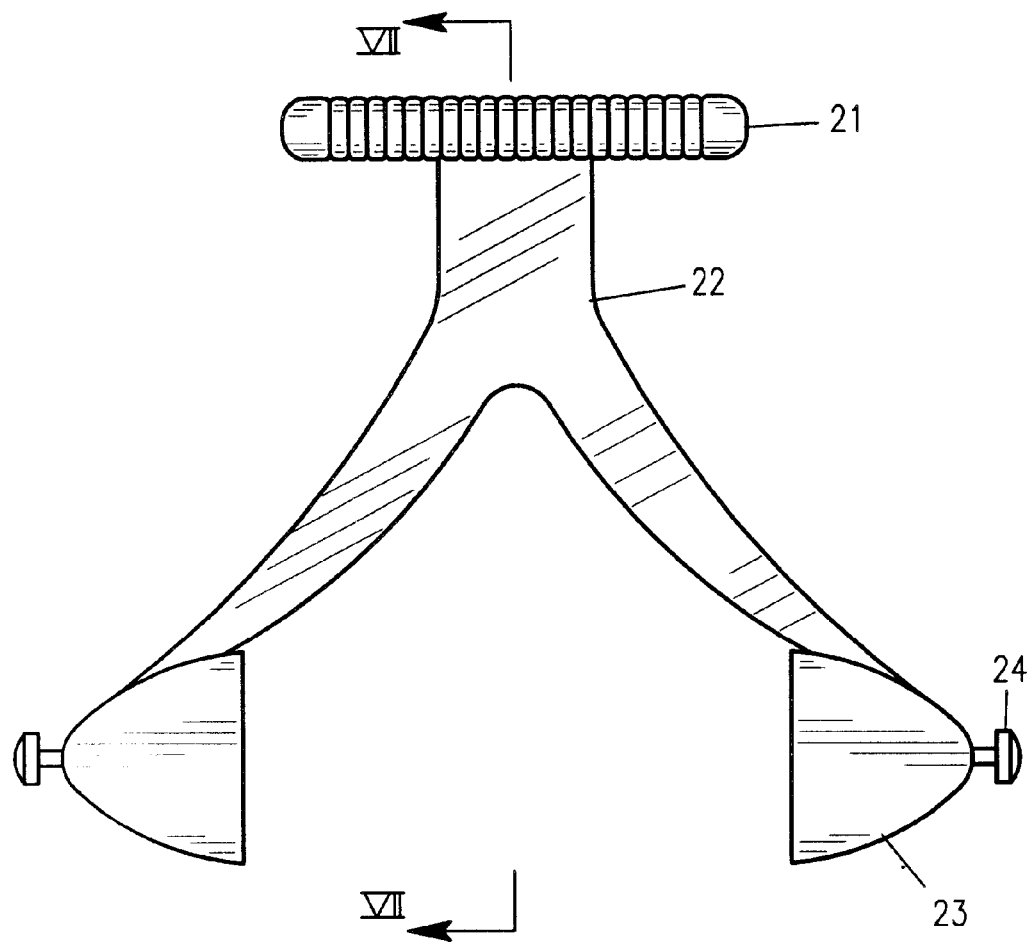
FIG. 5 is a top view of the roller and cob cups of a Kernel Buster, according to the preferred embodiment of the present invention.
Figure 6:
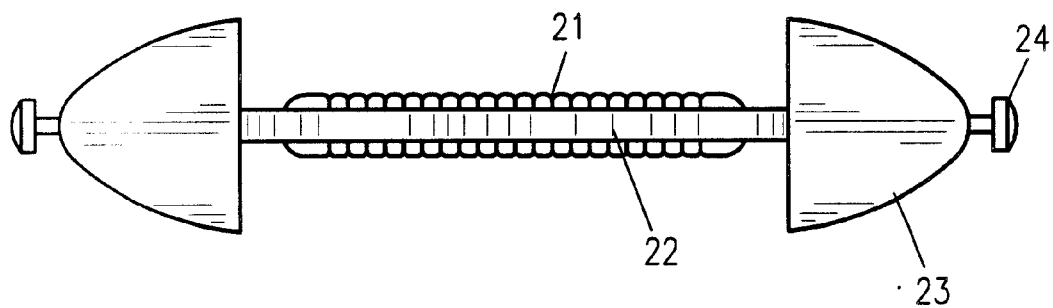
FIG. 6 is a front view of the roller and cob cups of a Kernel Buster, according to the preferred embodiment of the present invention.
Figure 7:
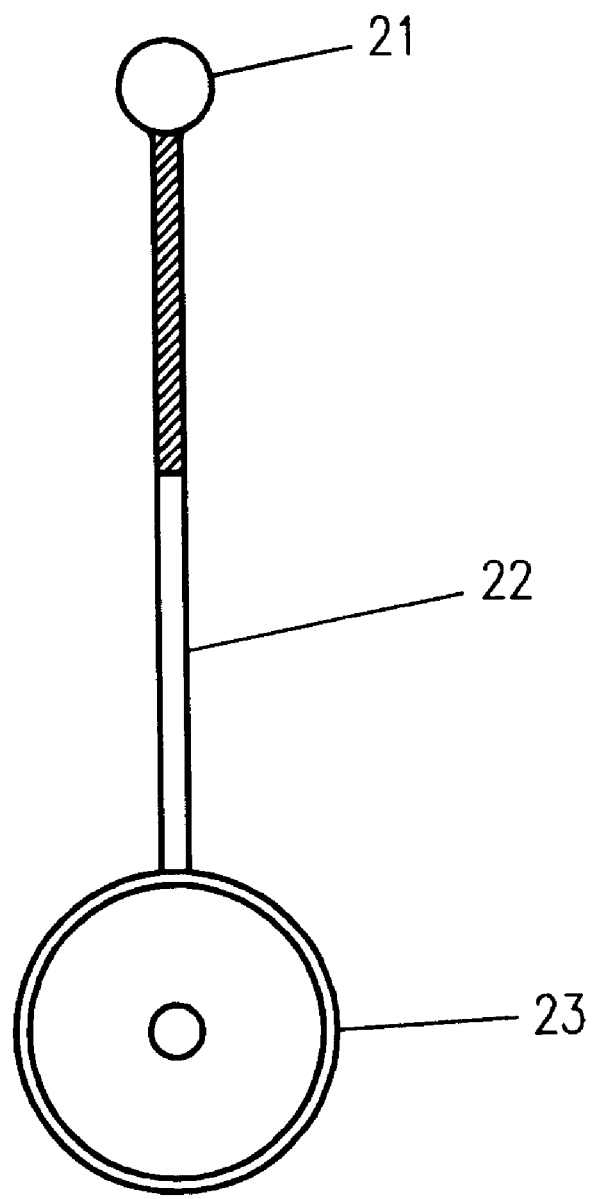
FIG. 7 is a cutaway view of the roller and cob cup assembly taken along line V—V of FIG. 5 of a Kernel Buster, according to the preferred embodiment of the present invention.

Referring now to FIG. 5, 6 and 7, a top, front and cutaway sideview of roller 20 is shown for a Kernel Buster 10 comprised of a handle 21, Y-Shaped handle 22, cob cups 23 and knobs 24. Handle 21 may be made of the same material as Y-Shaped handle 22 or any other suitable material. As previously discussed, an ear of corn is inserted between cups 23 by slightly expanding the twin arms of Y-Shaped handle 22. Cups 23 encase the ends of the cobs while the twin arms of Y-Shaped handle 22 bias the cups against the ends of the ear of corn as a result of the slight expansion of said arms in the opposite direction.

Operation of the Preferred Embodiment

To use the present invention, one simply inserts an ear of corn between the twin cups, firmly presses the surface of the cob against the rolling board, and rolls the cob back and forth over the teeth on the rolling board several times. The sharp teeth penetrate the tough husks thereby allowing one with an eating disorder to bite the cob and remove the soft material inside the kernel.

The foregoing description is included to illustrate the operation of the preferred embodiment and is not meant to limit the scope of the invention. The scope of the invention is to be limited only by the following claims.

What is claimed is:

1. A kernel buster for piercing the tough husks of kernels on an ear of corn comprised of:

a roller handle, said roller handle having a Y-shaped construction made from a semi-flexible material forming a pair of articulating structural members for allowing one to expand a gap between a set of tips of said structural members and for inserting therebetween an ear of corn and wherein the distance between the tips of said structural members would be a minimum of six inches; and a rolling board, wherein said rolling board provides a surface against which the surface of a cob may be firmly pressed;

and wherein said Y-shaped handle is further comprised of:

a pair of cups, said cups rotatably attached at ends of the tips of the Y-shaped handle for securably receiving ends of the corn cob and wherein said cups having a conical parabolic shape and being attached at vertex of their outer surface to the tips of said Y-shaped handle thereby aligning the cups such that a concave inner surface of each face each other; and a pair of knobs, said pair of knobs located on said tips of said Y-shaped handle's outer side for providing user with points to grasp when expanding said Y-shaped handle when inserting said ear of corn.

2. The kernel buster described in claim 1 wherein said ear of corn being free to rotate along the longitudinal axis of said cups and rotation of said ear of corn being defined by a line between said tips of said Y-shaped handle and wherein said cups encasing the ends of said ear of corn while said structural members of said Y-shaped handle biasing said cups against the ends of said ear of corn cob.

3. The kernel buster described in claim 2, wherein said rolling board is further comprised of:
- a handle, said handle being of sufficient length for allowing one to get a firm grasp thereon during rolling;
- a base, said base having a length and width which may vary as desired with the only requirement that the width being sufficient for accommodating said ear of corn and the length being such that a rolling area provided effectively pierces the kernels of said ear of corn; and
- a plurality of teeth, said plurality of teeth being permanently embedded on one side of said base with a pointed side facing outward and wherein said teeth being arranged in rows and columns and spaced close enough such that a tooth would be available to pierce every kernel on said ear of corn when rolled against said base.

* * * * *